US012664404B2

(12) United States Patent
Sakhinana et al.

(10) Patent No.: US 12,664,404 B2
(45) Date of Patent: Jun. 23, 2026

(54) PRIVACY PRESERVING GENERATIVE MECHANISM FOR INDUSTRIAL TIME-SERIES DATA DISCLOSURE

(71) Applicant: Tata Consultancy Services Limited, Mumbai (IN)

(72) Inventors: Sagar Srinivas Sakhinana, Pune (IN); Venkataramana Runkana, Pune (IN); Rajat Kumar Sarkar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1059 days.

(21) Appl. No.: 17/804,682

(22) Filed: May 31, 2022

(65) Prior Publication Data

US 2023/0281427 A1     Sep. 7, 2023

(30) Foreign Application Priority Data

Mar. 4, 2022    (IN) ............................. 202221011897

(51) Int. Cl.
*G06N 3/045*          (2023.01)
*G06F 18/214*        (2023.01)
(Continued)

(52) U.S. Cl.
CPC ........... *G06N 3/045* (2023.01); *G06F 18/214* (2023.01); *G06F 21/6245* (2013.01);
(Continued)

(58) Field of Classification Search
CPC ........ G06N 3/045; G06N 3/08; G06N 3/0499; G06N 3/0455; G06N 3/0475; G06N 5/01;
(Continued)

(56) References Cited

U.S. PATENT DOCUMENTS

2019/0197425 A1*  6/2019  Yuan ........................ G06F 17/15
2019/0370632 A1*  12/2019  Hashemi .................. G06N 3/08
(Continued)

OTHER PUBLICATIONS

Torfi, Amirsina, "Privacy-Preserving Synthetic Medical Data Generation with Deep Learning", Doctor of Philosophy in Computer Science and Application, Date: Aug. 2020, Publisher: Virginia Tech, https://vtechworks.lib.vt.edu/bitstream/handle/10919/99856/Torfi_ A_D_2020.pdf.

(Continued)

*Primary Examiner* — Mariela Reyes
*Assistant Examiner* — Skieler Alexander Kowalik
(74) *Attorney, Agent, or Firm* — FINNEGAN, HENDERSON, FARABOW, GARRETT & DUNNER LLP

(57)          ABSTRACT

Existing privacy-preserving techniques suffer from inherent drawbacks to retain characteristics of observed, and original industrial time series data for utility in the downstream tasks such as process modelling, control, optimization and etc. The embodiments herein provide a method and system for privacy preserving generative mechanism for data-disclosure of the industrial multivariate mixed-variable time series data. The system fuses an industrial time series data with a random gaussian noise to preserve the privacy of the industrial time series data and trades-off the privacy with the utility of synthetic-private data. Further, the system presents the privacy-preserving synthetic industrial data generative mechanism for data disclosure with minimal risk of AI technique and strong privacy guarantees. Embedding privacy by design into the generative mechanism approaches present an alternate paradigm of learning in contrast to the reduced-order modeling and numerical solutions of the industrial time-series data based on the principles in continuum mechanics for data disclosure with privacy.

7 Claims, 5 Drawing Sheets

100

(51) Int. Cl.
| | |
|---|---|
| *G06F 21/62* | (2013.01) |
| *G06N 3/042* | (2023.01) |
| *G06N 3/0455* | (2023.01) |
| *G06N 3/0475* | (2023.01) |
| *G06N 3/08* | (2023.01) |
| *G06N 3/094* | (2023.01) |
| *G06N 5/01* | (2023.01) |

(52) U.S. Cl.
CPC ........... *G06N 3/042* (2023.01); *G06N 3/0455* (2023.01); *G06N 3/0475* (2023.01); *G06N 3/08* (2013.01); *G06N 3/094* (2023.01); *G06N 5/01* (2023.01)

(58) Field of Classification Search
CPC ...... G06N 3/042; G06N 3/094; G06F 18/214; G06F 21/6245
See application file for complete search history.

(56) References Cited

U.S. PATENT DOCUMENTS

| | | | |
|---|---|---|---|
| 2020/0193290 A1* | 6/2020 | Cho | .......................... G06N 3/08 |
| 2021/0343410 A1* | 11/2021 | Zhang | .................... G06N 3/044 |
| 2021/0358604 A1* | 11/2021 | Kearney | .............. G06N 3/0985 |
| 2024/0087750 A1* | 3/2024 | Lo Ciganic | ............ G16H 50/30 |

OTHER PUBLICATIONS

Georges-Filteau, Jeremy et al., "Synthetic Observational Health Data with GANs: from slow adoption to a boom in medical research and ultimately digital twins?", Machine Learning, Date: Nov. 2020, Publisher: Arxiv, https://arxiv.org/pdf/2005.13510.pdf.

Liu, Lixue et al., "GAN-MDF: A Method for Multi-fidelity Data Fusion in Digital Twins", Machine Learning, Date: Jun. 2021, Publisher: Arxiv, https://arxiv.org/pdf/2106.14655.pdf.

Jälkö, Joonas et al., "GAN-MDF: Privacy-preserving data sharing via probabilistic modeling", Patterns, Date: Jul. 2021, vol. 2, Issue: 9, Publisher: Science Direct, https://arxiv.org/pdf/1912.04439.pdf.

Beaulieu-Jones, Brett K., et al., "Privacy-Preserving Generative Deep Neural Networks Support Clinical Data Sharing", Circulation Cardiovascular Quality and Outcomes, Date: Jul. 2019, vol. 12(7), Publisher: AHA Journal, https://www.researchgate.net/publication/334322192_Privacy-Preserving_Generative_Deep_Neural_Networks_Support_Clinical_Data_Sharing/link/5debc7b2a6fdcc28370eec89/download.

Abay, Nazmiye Ceren et al., "Privacy Preserving Synthetic Data Release Using Deep Learning", Machine Learning and Knowledge Discovery in Databases, Date: 2018, Publisher: Springer, https://www.researchgate.net/publication/330460051_Privacy_Preserving_Synthetic_Data_Release_Using_Deep_Learning/link/5c4b85ba6fdccd6b5c977a6/download.

Kuppa, Aditya et al., "Towards Improving Privacy of Synthetic DataSet", Privacy Technologies and Policy, Date: Jun. 2021, Publisher: Springer, https://www.researchgate.net/publication/350176581_Towards_Improving_Privacy_of_Synthetic_DataSet/link/50a3a06792851cc80b6257ee/download.

Liu, Yi et al., "PPGAN: Privacy-Preserving Generative Adversarial Network", Machine Learning, Date: Oct. 2019, Publisher: Arxiv, https://arxiv.org/pdf/1910.02007.pdf.

Rosenblatt, Lucas et al., "Differentially Private Synthetic Data: Applied Evaluations and Enhancements", Computers and Society, Date: Nov. 2020, Publisher: Arxiv, https://arxiv.org/pdf/2011.05537.pdf.

* cited by examiner

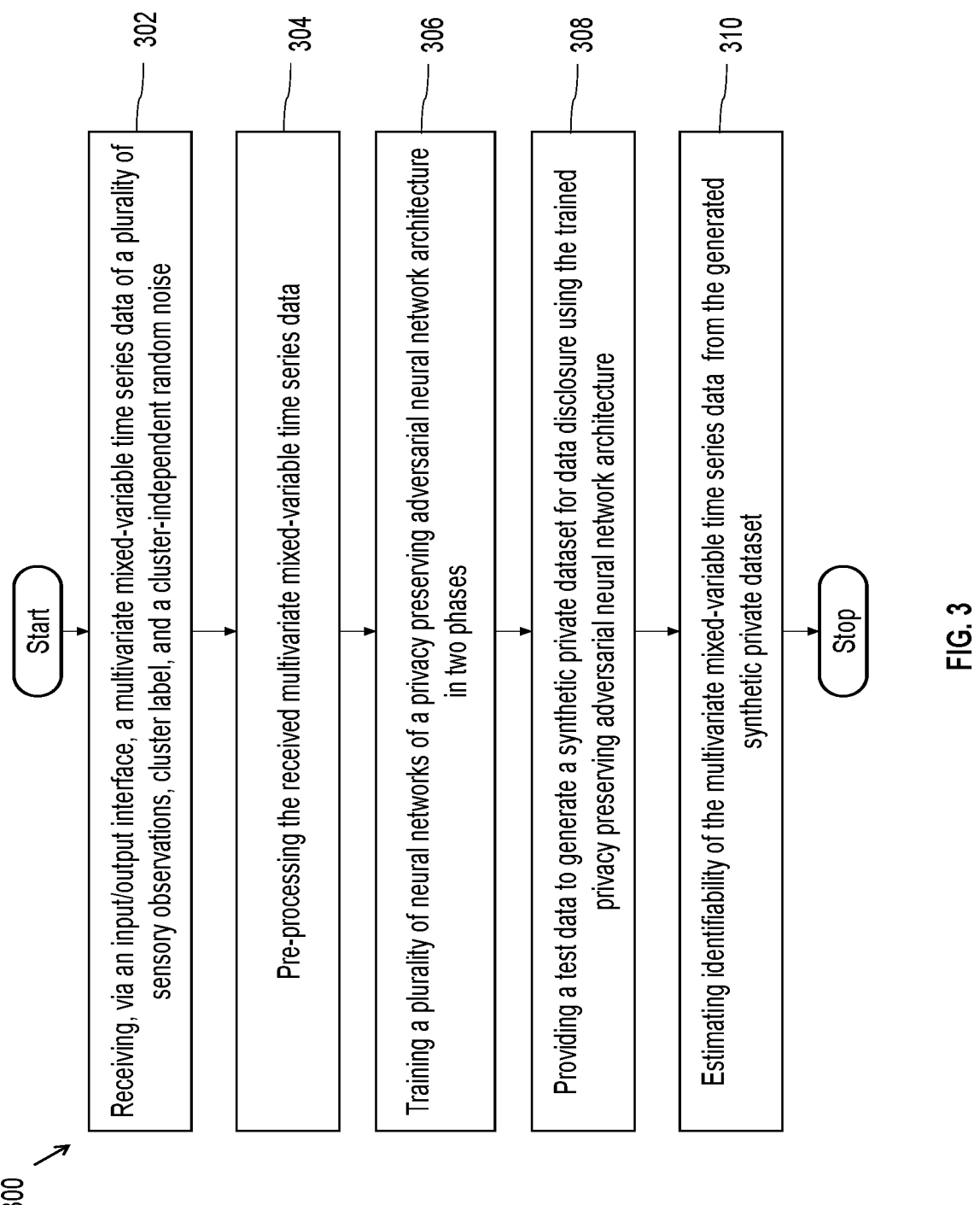

Start

Receiving, via an input/output interface, a multivariate mixed-variable time series data of a plurality of sensory observations, cluster label, and a cluster-independent random noise — 302

Pre-processing the received multivariate mixed-variable time series data — 304

Training a plurality of neural networks of a privacy preserving adversarial neural network architecture in two phases — 306

Providing a test data to generate a synthetic private dataset for data disclosure using the trained privacy preserving adversarial neural network architecture — 308

Estimating identifiability of the multivariate mixed-variable time series data from the generated synthetic private dataset — 310

Stop

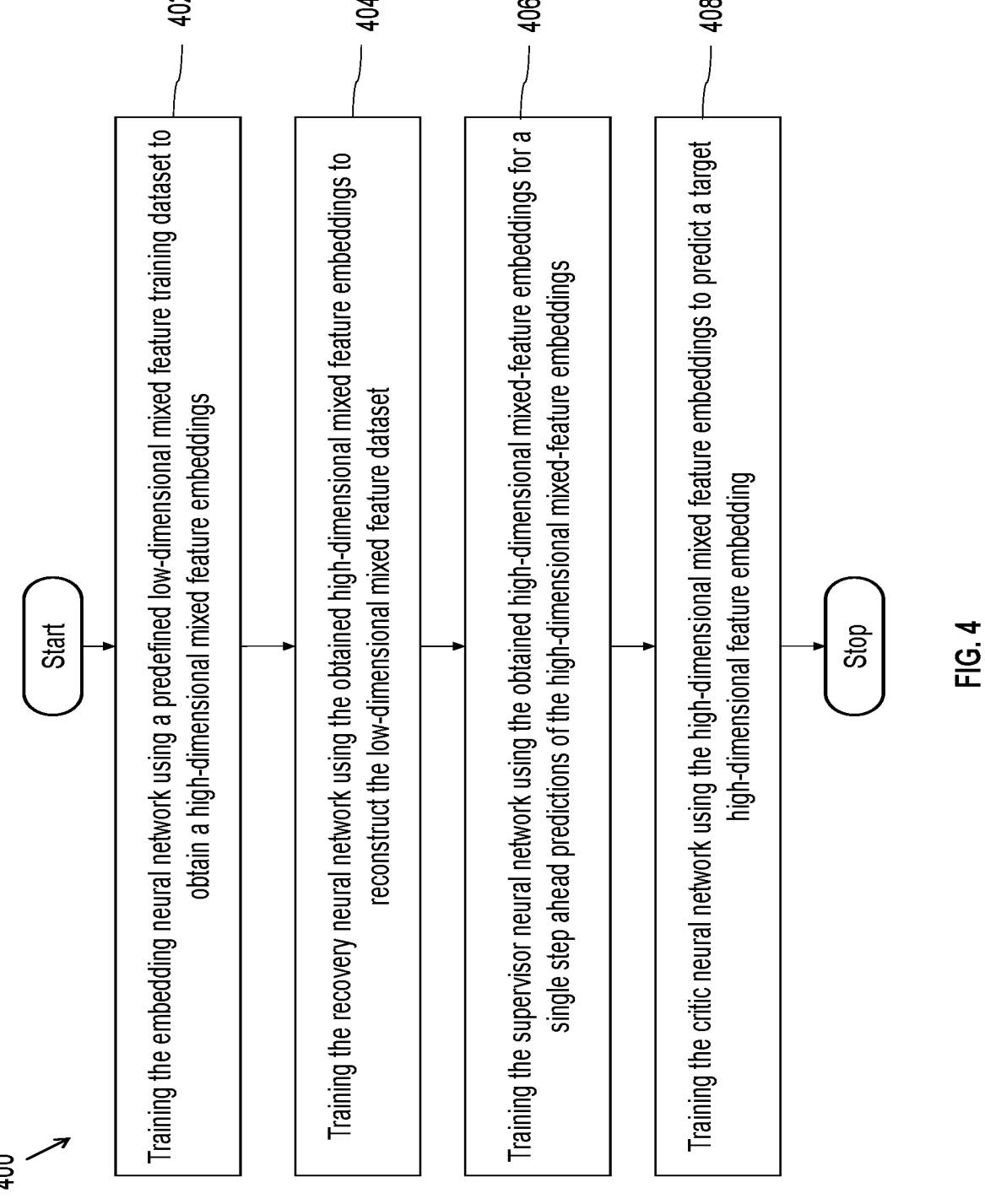

Start

402 — Training the embedding neural network using a predefined low-dimensional mixed feature training dataset to obtain a high-dimensional mixed feature embeddings 404 — Training the recovery neural network using the obtained high-dimensional mixed feature embeddings to reconstruct the low-dimensional mixed feature dataset 406 — Training the supervisor neural network using the obtained high-dimensional mixed-feature embeddings for a single step ahead predictions of the high-dimensional mixed-feature embeddings 408 — Training the critic neural network using the high-dimensional mixed feature embeddings to predict a target high-dimensional feature embedding Stop

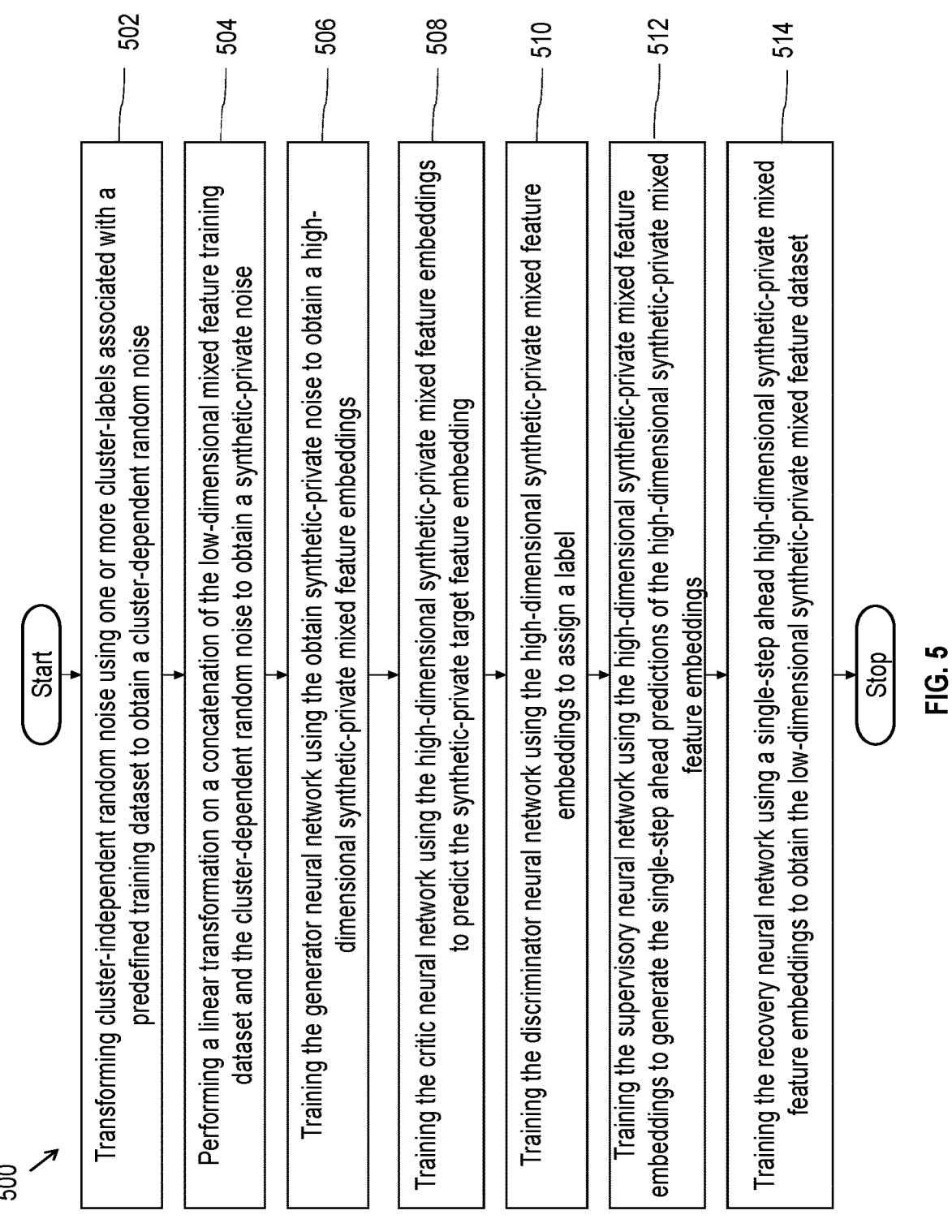

500

Start

Transforming cluster-independent random noise using one or more cluster-labels associated with a predefined training dataset to obtain a cluster-dependent random noise — 502

Performing a linear transformation on a concatenation of the low-dimensional mixed feature training dataset and the cluster-dependent random noise to obtain a synthetic-private noise — 504

Training the generator neural network using the obtain synthetic-private noise to obtain a high-dimensional synthetic-private mixed feature embeddings — 506

Training the critic neural network using the high-dimensional synthetic-private mixed feature embeddings to predict the synthetic-private target feature embedding — 508

Training the discriminator neural network using the high-dimensional synthetic-private mixed feature embeddings to assign a label — 510

Training the supervisory neural network using the high-dimensional synthetic-private mixed feature embeddings to generate the single-step ahead predictions of the high-dimensional synthetic-private mixed feature embeddings — 512

Training the recovery neural network using a single-step ahead high-dimensional synthetic-private mixed feature embeddings to obtain the low-dimensional synthetic-private mixed feature dataset — 514

Stop

FIG. 5

PRIVACY PRESERVING GENERATIVE MECHANISM FOR INDUSTRIAL TIME-SERIES DATA DISCLOSURE

CROSS-REFERENCE TO RELATED APPLICATIONS AND PRIORITY

This U.S. patent application claims priority under 35 U.S.C. § 119 to Indian Application number 202221011897, filed on Mar. 4, 2022. The entire contents of the aforementioned application are incorporated herein by reference.

TECHNICAL FIELD

The disclosure herein generally relates to the field of data privacy and more specifically, to a method and system for privacy preserving generative mechanism for data-disclosure of industrial multivariate mixed-variable time series data.

BACKGROUND

In the era of rapid advances in Artificial Intelligence (AI) deployment of deep learning techniques in the cloud for production, it has several complexities and risks involved relating to privacy, security, fairness, and accountability of data. Usually, regulators and policymakers across the globe present governance protocols such as the General Data Protection Regulation (GDPR), US Health Insurance Portability and Accountability Act (HIPAA), California Consumer Privacy Law (CCPA), European Commission AI Act, etc., to protect the ownership, and confidentiality of sensitive individual user information. These regulations present a Catch-22 of privacy and are mandatory for tech companies to comply with to avoid lawsuits and penalties. These regulations protect the privacy of individuals, encourage anonymization of the sensitive personal information for data-disclosure to be shared with third-parties.

The gold standards for security techniques in deep learning include cryptography techniques such as Homomorphic Encryption (HE), Secure Multi-party Computation (SMC), Differential Privacy (DP) & Information-Theoretic Privacy for data disclosure, Federated ML, Ethereum blockchain, and Smart contracts. There's a growing awareness and interest across several industrial data behemoths such as FMCG, oil & gas, aviation, power, semiconductor engineering, manufacturing etc. to prevent membership inference, model inversion, attribute inference, hyperparameter and parameter inference, and property inference by a third-party (adversary) to access unauthorized process plant operational data, which embeds the trade secrets, the product formulations & simultaneously adopting privacy embedded-AI techniques for digital twins to leverage the big data for process control, optimization, uncertainty quantification, etc.

There is a need and necessity for a mathematical framework to enhance privacy-preserving, trade-off to preserve utility for data monetization of the large-scale industrial and manufacturing plants multivariate mixed-variable time series data. The existing techniques of enabling privacy-preserving mechanisms for data disclosure have lack luster utility and suffer from inherent drawbacks of preserving the original data characteristics in the private dataset generated for data-disclosure.

SUMMARY

Embodiments of the disclosure present technological improvements as solutions to one or more of the abovementioned technical problems recognized by the inventors in conventional systems. For example, in one embodiment, a method and system for privacy preserving generative mechanism for data-disclosure of industrial data is provided.

In one aspect, a processor-implemented method for privacy preserving generative mechanism for data-disclosure of industrial data is provided. The method includes one or more steps such as receiving, via an input/output interface, a multivariate mixed-variable time series data of a plurality of sensory observations, the cluster-labels associated with the multivariate mixed-variable time series data and a cluster-independent random noise, pre-processing, via one or more hardware processors, the received multivariate mixed-variable time series data, training, via a one or more hardware processors, a plurality of neural networks of a privacy preserving adversarial neural network architecture in two phases, providing, via the one or more hardware processors, a test data to generate a synthetic private dataset for data disclosure using the trained privacy preserving adversarial neural network architecture, and estimating, via the one or more hardware processors, identifiability of the multivariate mixed-variable time series data from the generated synthetic private dataset.

In another aspect, a system for privacy preserving generative mechanism for data-disclosure of industrial data is provided. The system includes an input/output interface configured to receive a multivariate mixed-variable time series data of a plurality of sensory observations, the cluster-labels associated with the multivariate mixed-variable time series data and a cluster-independent random noise, one or more hardware processors and at least one memory storing a plurality of instructions, wherein the one or more hardware processors are configured to execute the plurality of instructions stored in the at least one memory.

Further, the system is configured to pre-process the received a multivariate mixed-variable time series data, wherein the pre-process includes normalizing continuous feature variables by bounding heterogeneous measurements between a predefined range through a min-max scaling technique; and transforming discrete feature variables by representing as a sparse binary vector through a one-hot encoding technique. Further, the system is configured to train a plurality of neural networks of a privacy preserving adversarial neural network architecture in two phases, provide a test data to generate a synthetic private dataset for data disclosure using the trained privacy preserving adversarial neural network architecture and estimate an identifiability of the multivariate mixed-variable time series data from the generated synthetic private dataset, wherein the estimation satisfies a predefined process-identifiability criteria.

In yet another aspect, one or more non-transitory machine-readable information storage mediums are provided comprising one or more instructions, which when executed by one or more hardware processors causes a method for privacy preserving generative mechanism for data-disclosure of industrial data is provided. The method includes one or more steps such as receiving, via an input/output interface, a multivariate mixed-variable time series data of a plurality of sensory observations, the cluster-labels associated with the multivariate mixed-variable time series data and a cluster-independent random noise, pre-processing, via one or more hardware processors, the received multivariate mixed-variable time series data, training, via a one or more hardware processors, a plurality of neural networks of a privacy preserving adversarial neural network architecture in two phases, providing, via the one or more hardware processors, a test data to generate a synthetic private dataset for data disclosure using the trained privacy preserving adversarial neural network architecture, and estimating, via the one or more hardware processors, identifiability of the multivariate mixed-variable time series data from the generated synthetic private dataset.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is a flow diagram to illustrate a method for privacy preserving generative mechanism for data-disclosure of industrial data, in accordance with some embodiments of the present disclosure.

FIG. 4 is a flow diagram to illustrate a first phase training of a plurality of neural networks of a privacy preserving adversarial neural network architecture, in accordance with some embodiments of the present disclosure.

FIG. 5 is a flow diagram to illustrate a second phase training of the plurality of neural networks of the privacy preserving adversarial neural network architecture, in accordance with some embodiments of the present disclosure.

DETAILED DESCRIPTION OF EMBODIMENTS

Figure 1:
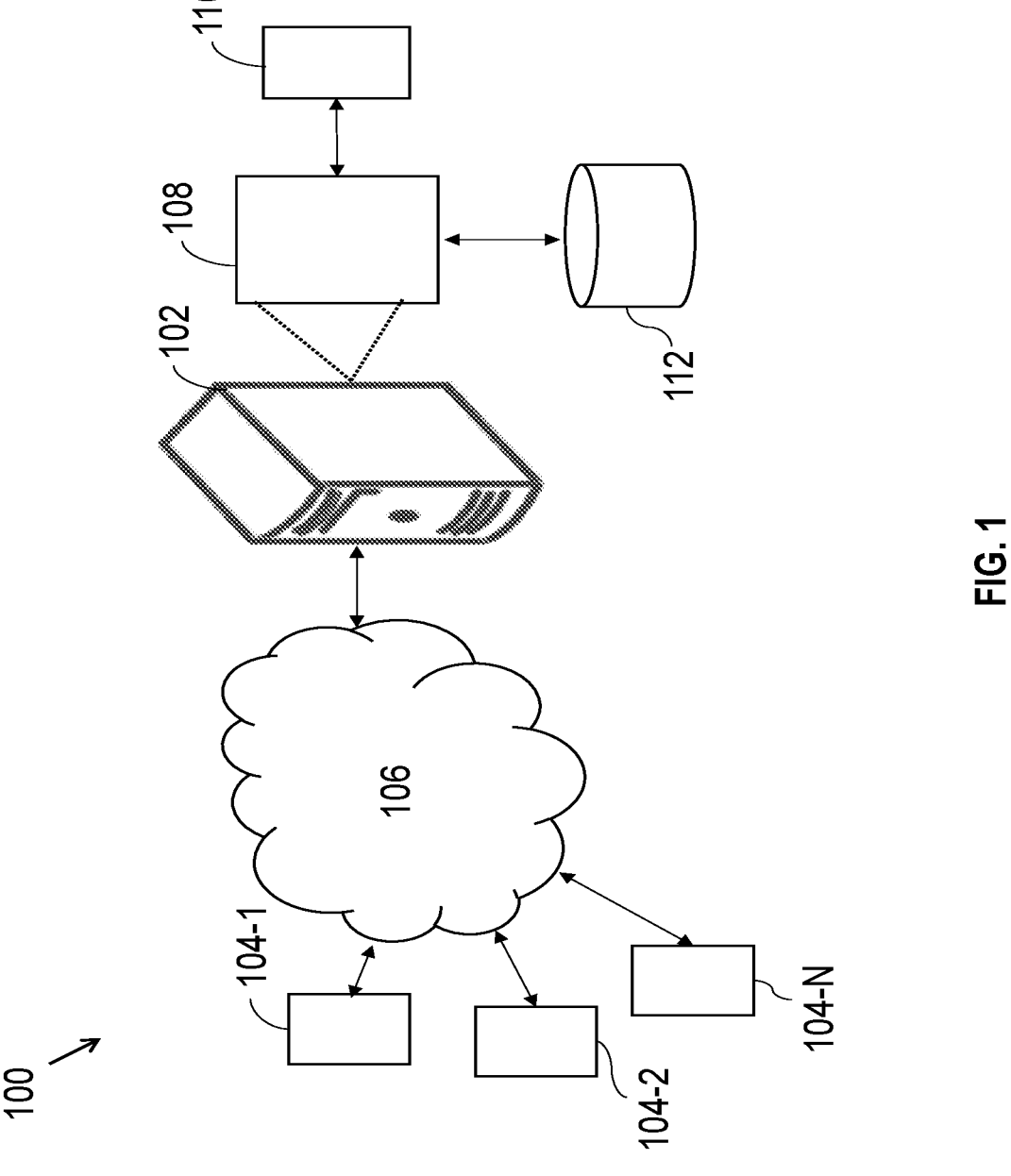
FIG. 1 illustrates a block diagram of an exemplary system for privacy preserving generative mechanism for data-disclosure of industrial data, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for privacy preserving generative mechanism for data-disclosure of the industrial multivariate mixed-variable time-series data. The proposed invention fuses an industrial multivariate mixed-variable time series data with a random gaussian noise to preserve the privacy of the industrial multivariate mixed-variable time series data and trades-off the privacy with the utility of synthetic-private data.

It is to be noted that in the era of rapid advances in Artificial Intelligence (AI) techniques, deployment of deep learning techniques in the cloud for production has several complexities and risks involved relating to privacy, security, fairness, and accountability. There is a need and necessity to develop privacy embedded physics-informed deep learning-based generative mechanism to solve complex science and engineering industrial problems by leveraging multivariate synthetic-private data and with a mutual gain of avoiding privacy-breach from adversaries to prevent inference attacks based on de-anonymization techniques. Notable works in the multivariate mixed-variable time series, be short of incorporating privacy-preserving mechanisms into generative models to maintain the end-user trust. The key challenges are determining the exact translation between the regulatory documents and implementable data-driven anonymization of AI techniques.

Therefore, the one or more embodiments herein presents the privacy-preserving synthetic industrial data generative mechanism for data disclosure with minimal risk of AI technique and strong privacy guarantees. Embedding privacy by design into the generative mechanism approaches present an alternate paradigm of learning in contrast to the reduced-order modeling and numerical solutions of the industrial data based on the principles in continuum mechanics for data disclosure with privacy.

The deep learning-based generative techniques integrated synergistically with privacy-preserving mechanisms to generate the synthetic-private data almost but not-quite real data. The privacy enabled generative techniques provides trustworthiness on the generated privacy-preserving synthetic data that quench both the ethical and legal needs for securing industrial data confidentiality (minimize the process identifiability) and trade-off to preserve the temporal dynamics, probability distributions of the real data to retain utility in downstream predictive analytics tasks. Privacy preservation by sanitizing the data of the associated industrial client (data owner) is of paramount importance for privacy-first tech companies (trusted party holding the sensitive data) to avoid legal subpoena for privacy-breach and it permits the deep-learning practitioners to build AI techniques by utilizing synthetic-private data to improve the modeling of engineering systems.

A privacy-preserving Generative Adversarial Network (ppGAN) is a private learning technique that minimizes and regulates the information flow. It is based on a rubric defined on the optimal transport for machine learning in a Kantorovich formulation between the empirical probability distributions of a synthetic-private data and a non-linear original data. The ppGAN comprises a generator neural network that sanitizes the multivariate mixed-variable time series dataset to a certain extent. It occludes threat of inference attacks on the process-plants database, and a discriminator neural network that attempts to maximize the Wasserstein distance between the real data and privacy-preserving synthetic data probability distributions.

Figure 2:
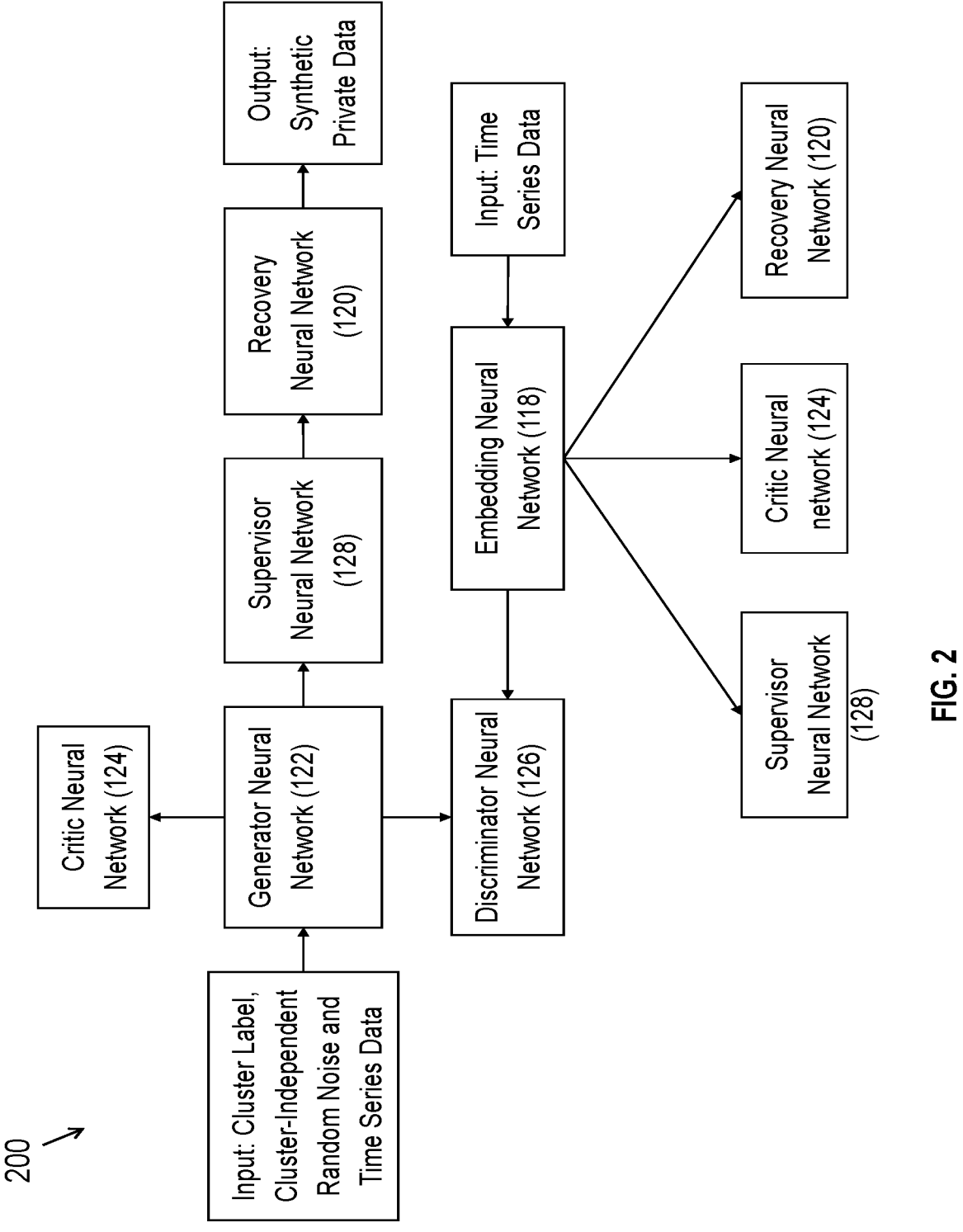
FIG. 2 is a functional block diagram of the system for privacy preserving generative mechanism for data-disclosure of industrial data, according to an embodiment of the present disclosure.

Referring now to the drawings, and more particularly to FIG. 1 through 3, where similar reference characters denote corresponding features consistently throughout the figures, there are shown preferred embodiments and these embodiments are described in the context of the following exemplary system and/or method.

FIG. 1 illustrates a block diagram of a system (100) for privacy preserving generative mechanism for data-disclosure of the industrial data, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory with a plurality of instructions, one or more databases (112), and one or more hardware processors (108) which are communicatively coupled with the at least one memory to execute a plurality of modules (114) therein. The components and functionalities of the system (100) are described further in detail.

Referring FIG. 2, illustrates a block diagram (200) of the system (100) for privacy preserving generative mechanism for data-disclosure of the industrial data. Herein, the one or more I/O interfaces (104) are configured to receive a multivariate mixed-variable time series data of a plurality of sensory observations, the cluster-labels associated with the multivariate mixed-variable time series data and a cluster-independent random noise. The received multivariate mixed-variable time series data is pre-processed to normalize continuous feature variables by bounding heterogeneous measurements between a predefined range of a min-max scaling technique. Discrete feature variables are transformed by representing as a sparse binary vector through a one-hot encoding technique.

In another embodiment, the system (100) comprises a plurality of neural networks (116) of the privacy preserving generative adversarial network architecture. Herein, the plurality of neural networks includes an embedding neural network (118), a recovery neural network (120), a generator neural network (122), a critic neural network (124), a discriminator neural network (126), and supervisory neural network (128). The plurality of neural networks (116) are trained in two phases. In the first phase the embedding neural network (118) is trained using a predefined low-dimensional mixed feature training dataset to obtain a high-dimensional mixed feature embeddings. Wherein, the obtained high-dimensional mixed feature embeddings are used to train a supervisory neural network (128) for a single step ahead predictions of the high-dimensional mixed-feature embeddings. It is to be noted that the supervisory neural network (128) is utilized to model a temporal dynamics of the low-dimensional mixed feature training dataset. Furthermore, the critic neural network (124) of the privacy preserving generative adversarial network architecture is trained using the high-dimensional mixed feature embeddings to predict a target high-dimensional feature embedding.

The embedding neural network (118), $E_{ppGAN}$ learns a high-dimensional representation, $$H_{train_{n,1:T_n}}, \forall n \in \{(1, 2, \ldots, N)\}$$

by transforming the corresponding low-dimensional real sequences, $$\tilde{I}_{train_{n,1:T_n}}, \forall n \in \{(1, 2, \ldots, N)\}.$$

The embedding neural network (118) assists in effective learning by incorporating the semantics of the mixed-feature variables in its feature embeddings, $$H_{train_{n,1:T_n}}.$$

The mathematical description of the embedding module is as follows:

$$E_{ppGAN} : I_{train_{n,1:T_n}} \in \Pi_t \Pi_{j=1}^{f} D_j \rightarrow H_{train_{n,1:T_n}} \in \Pi_t \Pi_{j=1}^{f} H_j, \tag{1}$$
$$\forall n \in \{(1, 2, \ldots, N)\}$$

wherein, $D_j$, $H_j$ denotes the j-th feature variable space & latent embedding vector space, respectively.

The recovery neural network (120), $R_{ppGAN}$ obtains the low-dimensional feature representations, $$\tilde{I}_{train_{n,1:T_n}}, \forall n \in \{(1, 2, \ldots, N)\}$$

from its corresponding high-dimensional temporal latent variables, $$H_{train_{n,1:T_n}}, \forall n \in \{(1, 2, \ldots, N)\},$$

$$R_{ppGAN} : H^*_{n,1:T_n} \in \prod_t \prod_{j=1}^{f} H_j \rightarrow I^*_{n,1:T_n} \in \prod_t \prod_{j=1}^{f} D_j, \tag{2}$$
$$\forall n \in \{(1, 2, \ldots, N)\}$$

wherein, the superscript, * denotes for real variables, $$H_{train_{n,1:T_n}}, \tilde{I}_{train_{n,1:T_n}}$$

or for synthetic variables, $$\hat{H}'_{n,1:T_n} \text{ and } \tilde{I}_{n,1:T_n}$$

respectively.

$$\vec{e}_{rnn} \text{ and } \vec{r}_{rnn}$$

are autoregressive neural-net models. They are realized with a unidirectional recurrent neural network with extended memory.

$$e_f, r_f^c, \text{ and } r_f^d$$

are parameterized by feed-forward neural networks. S, $S_m$ denote the sigmoid & softmax activation function, respectively.

The trainable parameters of the embedding neural network ($E_{ppGAN}$) and recovery neural network (120) ($R_{ppGAN}$) are updated by optimizing a cost function through the joint training of the networks in a supervised-learning approach. It incorporates appropriate inductive bias of reconstruction of the original input, $$\tilde{I}_{train_{n,1:T_n}}$$

through by minimizing a supervised loss as described below, $$L_R = \Sigma_{n=1}^{N} \|I_{train_{n,1:T_n}} - \tilde{I}_{train_{n,1:T_n}}\|_2 \qquad (3)$$

In joint training of the generator, supervisor, and the recovery neural networks in unsupervised learning approach in a zero-sum game, the system (100) is configured to minimize the first moment, $|L_1 - L_2|$ and second-order moment, $$\left| \sqrt{\hat{\sigma}_1^2} - \sqrt{\hat{\sigma}_2^2} \right|$$

differences, defined between the original data, $$I_{train_{n,1:T_n}}$$

and the synthetic-private data, $\tilde{I}_{n,1:T_n}$ respectively. The lower the difference the synthetic-private data sampled from $$\tilde{P}\left(\tilde{I}_{n,1:T_n}^{(1:c,c+1:d)}\right)$$

are more likely to come from the same original data distribution, $$P\left(I_{n,1:T_n}^{(1:c,c+1:d)}\right).$$

The sample means for real data, $$I_{train_{n,1:T_n}}$$

and synthetic-private data, $\tilde{I}_{n,1:T_n}$ are computed by, $$L_1 = \frac{1}{N} \sum_{j=1}^{f} \sum_{n=1}^{N} I_{train_{n,1:T_n}}^{(j)} \in I^{(f)}$$

and $$L_2 = \frac{1}{N} \sum_{j=1}^{f} \sum_{n=1}^{N} \tilde{I}_{n,1:T_n}^{(j)} \in I^{(f)}.$$

The sample variances, $$\hat{\sigma}_1^2, \hat{\sigma}_2^2 \in I^{(f)}$$

are evaluated by, $$\hat{\sigma}^2 = \frac{1}{N} \sum_{j=1}^{f} \sum_{n=1}^{N} \left( I_{train_{n,1:T_n}}^{(j)} - L_1^{(j)} \right)^2 \qquad (4)$$

and $$\hat{\sigma}_2^2 = \frac{1}{N} \sum_{j=1}^{f} \sum_{n=1}^{N} \left( \tilde{I}_{n,1:T_n}^{(j)} - L_2^{(j)} \right)^2. \qquad (5)$$

$$L_{US} = |L_1 - L_2| + \left| \sqrt{\hat{\sigma}_1^2} - \sqrt{\hat{\sigma}_2^2} \right| \qquad (6)$$

The ppGAN neural architecture in the unsupervised learning approach trains the joint-transformation network of the private-data generator ($G_{ppGAN}$), supervisor network ($S_{ppGAN}$), and the recovery neural network (120) ($R_{ppGAN}$) to transform samples, $Z_{n,1:T_n} \sim P(Z)$ into $$R_{ppGAN}\left(S_{ppGAN}\left(G_{ppGAN}\left(Z_{n,1:T_n}\right)\right)\right) \sim \tilde{P}\left(\tilde{I}_{n,1:T_n}^{(1:c,c+1:d)}\right)$$

such that $$\tilde{P}\left(\tilde{I}_{n,1:T_n}^{(1:c,c+1:d)}\right) \approx P\left(I_{n,1:T_n}^{(1:c,c+1:d)}\right).$$

By minimizing, $L_{US}$, $P(\hat{D}_{n,1:T_n})$ learns the underlying probability distributions of the input temporal data, $$P(\tilde{D}_{train_{n,1:T_n}}).$$

In yet another embodiment, the system (100) is configured for a second phase training of the plurality of neural networks of a privacy preserving adversarial neural network architecture. Wherein, the received cluster-independent random noise is transformed using one or more cluster-labels associated with a predefined training dataset to obtain a cluster-dependent random noise. Further, a linear transformation on a concatenation of the low-dimensional mixed feature training dataset and the cluster-dependent random noise is performed to obtain a synthetic-private noise to train the generator neural network (122) of the privacy preserving adversarial neural network architecture. The generator neural network (122) provides a high-dimensional synthetic-private mixed feature embeddings to train the discriminator neural network (126). It would be appreciated that the discriminator neural network (126) assigns a label to the high-dimensional synthetic-private mixed feature embeddings such as real or fake.

In yet another embodiment, the supervisory neural network (128) is trained using the high-dimensional synthetic-private feature embeddings to generate the single-step ahead predictions of the high-dimensional synthetic-private feature embeddings and the recovery neural network (120) is trained using a single-step ahead high-dimensional synthetic-private feature embeddings to obtain the low-dimensional synthetic-private mixed feature dataset.

In another embodiment, the supervisor neural network (128), $S_{ppGAN}$ is leveraged to model the non-linear temporal dynamics of the original data, $I_{n,1:T_n}$. By integrating the $S_{ppGAN}$ neural-network in the workflow to generate the synthetic-private data, $\tilde{I}_{n,1:T_n}$. The synthetic-private data captures the complex non-linear temporal dependencies of the original data. The $G_{ppGAN}$ neural-network of the ppGAN framework generates the synthetic high-dimensional latent embeddings, $\hat{H}_{n,1:T_n}$. The auto-regressive, $$S_{ppGAN}:H^*_{n,1:t-1} \to H^*_{n,t}, \forall\, n \in \{1, 2, \ldots, N\}, t \in 1:T_n$$

takes as input $$H^*_{n,1:t-1}$$

and predicts the single-step ahead temporal latent embeddings, $$H^*_{n,t}$$

conditioned on the past latent sequences. It can be presented as, $$S_{ppGAN}:H^*_{n,1:t-1} \in \prod_t \prod_{j=i}^{f} H_j \to H'^*_{n,1:T_n} \in \prod_t \prod_{j=i}^{f} H_j, \quad (7)$$
$$\forall\, n \in \{(1, 2, \ldots, N)\}$$

The ppGAN framework effectively captures the temporal dynamics of the real data by minimizing the supervised loss, $$L_S = \left[ \sum_{n=1}^{N} \sum_t \left\| \tilde{H}_{train_{n,t}} - S_{ppGAN}(H^*_{n,1:t-1}) \right\|_2 \right] \quad (8)$$

The $G_{ppGAN}$ by operating in the training-loop perceives the ground-truth high-dimensional latent representations, $$\tilde{H}_{train_{n,1:T_n}}$$

from the embedding neural network (118). The supervisor neural network (128) $S_{ppGAN}$ minimizes the loss, $L_S$ by forcing the $\hat{H}_{n,1:T_n}$ unflagged by the inaccurate adversary $(D_{ppGAN})$ to capture the single-step temporal dynamics of the $$\tilde{H}_{train_{n,1:T_n}}.$$

In yet another embodiment, the critic neural network (124), $$F_{ppGAN}: H^*_{n,1:T_n} \to R,$$

is a neural-network function leveraged for predictive modeling which maps the independent mixed-feature variables to the target variable, trained in the supervised learning approach. Here, (*) refers to $$H^{(1:f-1)}_{train} \text{ or } \hat{H}^{(1:f-1)}.$$

The critic neural network (124) takes as input the realizations of $$H^{(1:f-1)}_{train_{n,1:T_n}} \text{ or } \hat{H}^{(1:f-1)}_{n,1:T_n}, \in D^{T_n \times (1:f-1)}$$

and outputs, $$H^{(T)}_{train_{n,1:T_n}}$$

The variable subset selection includes the features attributes from the set, $$\{1, \ldots, f-1\} \subset f \text{ in } H^{\{(1,\ldots,f-1)\}^*}_{n,1:T_n}$$

as input feature variables to the predictive modeler. The last feature variable in $$H^{\{(T)\}^*}_{n,1:T_n}$$

denoted by the superscript, $T \in f$ denotes the target variable to predict. The loss function for the target variable prediction is described below, $$L_F\left(H_{train_{n,1:T_n}}, \hat{H}_{n,1:T_n}\right) = \quad (9)$$
$$\sum_{n=1}^{N} \left( F_{ppGAN}\left(H^{(1:f-1)}_{train_{n,1:T_n}}\right) - F_{ppGAN}(\hat{H}^{(1:f-1)}_{n,1:T_n}) \right)^2$$

Given the independent and identically distributed pairs, $$\left(H^{(1:f-1)}_{train_{n,1:T_n}}, H^{(T)}_{train_{n,1:T_n}}\right),$$

the critic neural network (124) learns the original relationship between independent feature variables and the target variable in the real dataset. $G_{ppGAN}$ generates the relationship preserving synthetic-private data, $\hat{D}_{n,1:T_n}$ by minimizing the $L_F$ during the adversarial joint training by inducing appropriate inductive learning bias and it generalizes well to the domain. $\vec{c}_{rnn}$ and $\vec{s}_{rnn}$ are autoregressive neural-net models and it is implemented with a unidirectional recurrent neural network with extended memory. $s_f$ and $c_f$ are implemented by a feed-forward neural network.

Let us assume, $Z_{n,1:T_n} \in R^{T_n \times f}$, $\forall n \in \{1, 2, \ldots, N\}$ denote the realizations of an f-dimensional Gaussian random variable of finite-length, $T_n$ for a sequence, n with values in the range [0,1) sampled from a gaussian distribution, $Z \sim N(0,1)$. We embed the cluster labels, $$C_{train_{n,1:T_n}} \in R^{T_n}, \forall\, n \in \{1,2, \ldots, N\}$$

in gaussian noise, $Z_{n,1:T_n}$ to determine the cluster-dependent random noise, $$Z^K_{n,1:T_n}.$$

The ground-truth, cluster-membership is computed by an iterative Euclidean distance-based classification technique in data mining to split the unlabeled dataset, $$I_{train_{n,1:T_n}}$$

into K-fixed-apriori disjoint clusters by minimizing the within-cluster sum-of-squares criterion. The system (100) is configured to determine the label embedding vectors, $e^c \in R^{d'}$, $\forall c \in \{1, \ldots, K\}$ from the trainable semantics-aware cluster membership embedding matrix, $W \in R^{K \times d'}$ based on the cluster labels, $$\tilde{C}_{train_{n,1:T_n}}.$$

d' is the dimension of the embedding matrix, W. We determine the label matrix, $$L^c_{n,1:T_n}$$

by concatenating the cluster membership embedding vectors, $e^c$ corresponding to the cluster labels, $$C_{train_{n,1:T_n}}.$$

Further, the system (100) is configured to perform the matrix-matrix product of $Z_{n,1:T_n}$ and the transpose of the label matrix, $$L^c_{n,1:T_n}$$

to obtain the cluster label aware random noise, $$Z^K_{n,1:T_n}.$$

The discrete-grouping cluster labels, $$C_{train_{n,1:T_n}}$$

corresponding to the mixed-feature dataset, $$I_{train_{n,1:T_n}}$$

are obtained through the unsupervised learning technique. It is determined by the k-means clustering technique as follows:
1. Randomly initialize cluster centroids, $\mu_1$, $\mu_2$, . . . , $\mu_K \in D^{(f)}$.
2.

$$\tilde{C}_{train_{n,1:T_n}} = \{\ \}; \forall\, n \in \{1,2, \ldots, N\}$$

3. Repeat until convergence so as to minimize the within-cluster sum of pairwise squared deviations:
{For every n, while n≤N, $\forall n \in \{1, 2, \ldots, N\}$,
For each n,
Assign each observation, $$I_{train_{n,t}}, t \in 1:T_n, \, \forall\, n \in \{1,2, \ldots, N\}$$

the closest cluster-label, $m \in \{1, 2, \ldots, K\}$ $$C_{train_{n,1:T_n}} := \underset{m}{\mathrm{argmin}} \left\| I_{train_{n,1:T_n}} - \mu_m \right\|^2 \tag{10}$$

For each $m \in \{1, 2, \ldots, K\}$, refine the cluster-centroids, $\mu_m$ $$\mu_m := \frac{\sum_{t=1}^{T_n} 1\{C_{train_{n,1:T_n}} = m\} \hat{D}_{train_{n,t}}}{\sum_{t=1}^{T_n} 1\{\tilde{C}_{train_{n,1:T_n}} = m\}} \tag{11}$$

The generator neural network (122) function takes as input the realizations of the low-dimensional, $$I_{train_{n,1:T_n}}, Z^K_{n,1:T_n}$$

and outputs a high-dimensional latent variable, $\hat{H}_{n,1:T_n}$ $$G_{ppGAN}: I_{train_{n,1:T_n}} \times Z^K_{n,1:T_n} \to \hat{H}_{n,1:T_n}, \forall\, n \in \{1,2, \ldots, N\} \tag{12}$$

The synthetic-private data generative can also be viewed as:

$$G_{ppGAN}: D^{(T_n,f)} \times [0,1]^{(T_n,f)} \to H^{(T_n,f)}, \forall n \in \{1,2, \ldots, N\} \quad (13)$$

The temporal latent embeddings, $\hat{H}_{n,1:T_n} \in H$ are computed as:

$$\hat{H}_{n,1:T_n} = G_{ppGAN}\left(W_{\theta'}\left[I_{train_{n,1:T_n}} \| Z^K_{n,1:T_n}\right]\right), \forall n \in \{1,2, \ldots, N\} \quad (14)$$

wherein, $W_{\theta'}$ denotes the learnable parameter. The weight matrix is shared across the sequences, n, $\forall n \in \{1, 2, \ldots, N\}$. $\|$ denotes the concatenation operator. $\vec{g}_{rmn}$ is an autoregressive neural-network model and it is implemented with a unidirectional recurrent neural network with extended memory. $g_f$ is parameterized by a feed-forward neural network.

The discriminator neural network (126), $D_{ppGAN}$ in ppGAN architecture is a classifier to differentiate the real, $$H_{train_{n,1:T_n}}$$

and the synthetic-private data, $\hat{H}_{n,1:T_n}$ and to minimize the Wasserstein distance between joint distributions, $$P\left(I^{(1:c,c+1:d)}_{n,1:T_n}\right), \hat{P}\left(\hat{I}^{(1:c,c+1:d)}_{n,1:T_n}\right)$$

on a given metric space, H. The $D_{ppGAN}$ is defined below, $$D_{ppGAN}: H^*_{n,1:T_n} \to p^*_{n,1:T_n,m}, p^*_{n,1:T_n}, P\left(H^*_{n,1:T_n}\right) \quad (15)$$

The discriminator neural network (126) takes as input the realizations of $$H^*_{n,1:T_n}$$

and outputs the predicted probability of cluster labels, $$p^*_{m,1:T_n,m},$$

the predicted probability of adversarial ground-truth, i.e true/fake, $$p^*_{m,1:T_n},$$

the estimated multivariate mixed-feature joint probability distributions, $$P\left(H^{(1:c,c+1,d)^*}_{n,1:T_n}\right)$$

as described below, $$p^*_{n,1:T_n,m}, p^*_{n,1:T_n}, P\left(H^{(1:c,c+1:d)^*}_{n,1:T_n}\right) = D_{ppGAN}\left(H^*_{n,1:T_n}\right), \forall n \in \{1, \ldots, N\} \quad (16)$$

Wherein, the superscript, * corresponds to $$H_{train_{n,1:T_n}},$$

real latent embeddings, $$p_{train_{n,1:T_n,m}}, p_{train_{n,1:T_n}}, P\left(H^{(1:c,c+1:d)}_{train_{n,1:T_n}}\right)$$

or $\hat{H}_{n,1:T_n}$, synthetic latent embeddings $$\hat{p}_{m,1:T_n,m}, \hat{p}_{n,1:T_n}, \hat{P}\left(\hat{H}^{(1:c,c+1:d)}_{n,1:T_n}\right)$$

The $G_{ppGAN}$ of the ppGAN framework produces synthetic-private latent embeddings, $\hat{H}_{n,1:T_n}$ of domain H, by operating on the random noise, $$Z^K_{n,1:T_n}$$

and the real data, $$I_{train_{n,1:T_n}}$$

and the discriminator neural network (126), $D_{ppGAN}$ by operating on the adversarial learning latent space, H, tries to differentiate latent temporal embeddings, $$H_{train_{n,1:T_n}} \& \hat{H}_{n,1:T_n}$$

and minimizes the Wasserstein distance between joint distributions. The binary cross-entropy loss for classification of the latent embeddings as true or fake is described by, $$(17)$$

$$L_U =$$

$$\frac{1}{N}\sum_{n=1}^{N}\left[-\left(y_{n,1:T_n}\log\left(p_{train_{n,1:T_n}}\right) + \left(1 - y_{n,1:T_n}\right)\log\left(1 - p_{train_{n,1:T_n}}\right)\right) + \right.$$

$$\left.\left(y_{n,1:T_n}\log(\hat{p}_{n,1:T_n}) + \left(1 - y_{n,1:T_n}\right)\log\left(1 - \hat{p}_{n,1:T_n}\right)\right)\right]$$

wherein, $y_{n,1:T_n} \in \{0,1\}^{T_n}, \forall n \in \{1, \ldots, N\}$ is the adversarial ground-truth, true or fake data.

$$p_{train_{n,1:T_n}}, \hat{p}_{n,1:T_n} \in [0, 1]^{T_n}, \forall n \in \{1, \ldots, N\}$$

is the predicted probability of the true data, and $$1 - p_{train_{n,1:T_n}} \quad \& \quad 1 - \hat{p}_{n,1:T_n}, \forall n \in \{1, \ldots, N\}$$

is the predicted probability of fake data. $D_{ppGAN}$ tries to minimize, $L_U$. The $G_{ppGAN}$ tries to maximize, $L_U$ which helps to learn $$\hat{P}(I_{n,1:T_n}^{(1:c,c+1:d)})$$

that best approximates $$P\left(I_{train_{n,1:T_n}}^{(1:c,c+1:d)}\right).$$

The prognostics of finite cluster-membership, $$C_{n,1:T_n}^* \in K$$

is a multinomial single-output classification task. The $* \in R^{T_n}$ refers to true or fake.

For the multinomial classification task of cluster-label prediction, the system (100) is configured to compute an individual loss for each cluster-membership, $\{1, \ldots, K\}$ per latent sequence, $n \in \{1, \ldots, N\}$ and at each time point $t(\in 1:T_n)$. Further, the system performs a summation operation of the output over the cluster membership & latent sequences.

$$L_{LP} = \frac{1}{N}\left[\sum_{m=1}^{K}\sum_{n=1}^{N} - \right. \tag{18}$$

$$\left. y_{n,1:T_n}^c \log\left(p_{train_{n,1:T_n,m}}\right) + \sum_{m=1}^{K}\sum_{n=1}^{N} y_{n,1:T_n}^c \log\left(\hat{p}_{n,1:T_n,m}\right)\right]$$

wherein, K denotes the fixed-apriori cluster labels.

$$y_{n,1:T_n}^c$$

is the ground-truth binary value of 1 or 0 if cluster label, m is the true label or false label at time point $t(\in 1:T_n)$ corresponding to latent sequence, $n \in \{1, \ldots, N\}$.

$$n \in \{1, \ldots, N\} \cdot p_{train_{n,1:T_n,m}}$$

is the predicted probability for real observation at a time point, t of a data sequence, $n \in \{1, \ldots, N\}$ belongs to cluster, m. $\hat{p}_{n,1:T_n,m}$ is the predicted probability for synthetic latent embedding at time point t of sequence, $n \in \{1, \ldots, N\}$ belonging to cluster membership, m. The cluster membership is determined by $$C_{train_{n,1:T_n}}^p := \arg\max_m\left[S_m\left(p_{train_{n,1:T_n,m}}\right)\right], m \in \{1, \ldots, K\} \tag{19}$$

$$\hat{C}_{n,1:T_n} := \arg\max_m\left[S_m\left(\hat{p}_{n,1:T_n,m}\right)\right], m \in \{1, \ldots, K\} \tag{20}$$

wherein, $S_m$ is the softmax activation function. The $D_{ppGAN}$ tries to minimize, $L_{LP}$ whereas $G_{ppGAN}$ tries to maximize, $$L_{LP} \cdot C_{train_{n,1:T_n}}^p$$

denote the predicted cluster membership for real data, $$D_{train_{n,1:T_n}}$$

by $D_{ppGAN}$ in comparison with the ground-truth, $$C_{train_{n,1:T_n}}$$

determined by the clustering technique. $\tilde{C}_{n,1:T_n}$ denote the predicted cluster-membership labels for the synthetic-private data, $\tilde{I}_{n,1:T_n}$. We also minimize the Wasserstein distance, the cost of the optimal transport plan between the estimates of two probability distributions $$P\left(H_{train_{n,1:T_n}}^{(1:c,c+1:d)}\right) \text{ and } \hat{P}(\hat{H}_{n,1:T_n}^{(1:c,c+1:d)}).$$

The system (100) evaluates the Wasserstein loss, $L_W$ and it is described by, $$L_W = W\left(P\left(H_{train_{n,1:T_n}}^{(1:c,c+1:d)}\right), \hat{P}(\hat{H}_{n,1:T_n}^{(1:c,c+1:d)})\right) = \tag{21}$$

$$\inf_{\gamma \sim \Pi(P,\hat{P})} E_{\left(H_{train_{n,1:T_n}}\right) \sim \gamma}\left[\left\|P\left(H_{train_{n,1:T_n}}^{(1:c,c+1:d)}\right) - \hat{P}(\hat{H}_{n,1:T_n}^{(1:c,c+1:d)})\right\|\right]$$

$$\text{wherein, } \gamma \sim \Pi\left(P\left(H_{train_{n,1:T_n}}^{(1:c,c+1:d)}\right), \hat{P}(\hat{H}_{n,1:T_n}^{(1:c,c+1:d)})\right)$$

is the set of all possible joint probability distributions between $$P\left(H_{train_{n,1:T_n}}^{(1:c,c+1:d)}\right) \text{ and } \hat{P}(\hat{H}_{n,1:T_n}^{(1:c,c+1:d)}).$$

The $D_{ppGAN}$ aims to maximize, $L_W$ whereas $G_{ppGAN}$ attempts to minimize, $L_W$. $\vec{g}_{rrn}$ and $\hat{d}_{rrn}$ are autoregressive neural-net models. They are implemented with a unidirectional recurrent neural network with extended memory.

$$g_f, d_f, d_f^c$$

are implemented by a feed-forward neural network.

The conditional generative neural network architecture, $G_{ppGAN}$ generates synthetic-private data, $\tilde{I}_{n,1:T_n}$ which must be sufficiently anonymized and non-identical enough in order to minimize the reidentification of the observed data, $I_{n,1:T_n}$. The finite series of data, $\tilde{I}_{n,t} \in D^{(f)}$ and $\tilde{I}_{n,t+1} \in D^{(f)}$ observed at time points, t and $t+1(\in \{1, \ldots, T_n\})$ of the same sequence, n or belong to distinct sequences, $n \in \{1, \ldots, N\}$ are non-identicalenough as they are actually measured at different time orders. The minimum(shortest) weighted euclidean distance computed between the observations in real data is the measure for non-identicalenough between the synthetic-private data and observed data.

In another embodiment, the system (100) is configured to estimate identifiability of the finite observed data by the finite synthetic-private data. Here, the system defines the ε-process identifiability as, there are lower than ε-fraction observations from the real dataset, $$I_{train_{n,1:T_n}}$$

in the synthetic-private dataset, $\tilde{I}_{n,1:T_n}$ that are mostcertain-lynot,non-identicalenough in comparison with the real data, $$I_{train_{n,1:T_n}}.$$

A randomized synthetic-private data generator mechanism, $G_{ppGAN}$ provides the ε-process identifiability, for some $\epsilon \in \underline{R}^+$, for any pair of nearest random variables $$I_{train_{n,t}}, I_{train_{n,t+1}} \in D^{(f)},$$

for all subsets S of the function-image of the randomized generative technique, $\tilde{I}_{n,t} \in D^{(f)}$ or $\tilde{I}_{n,1:T_n}$ is ε-process identifiable from $$I_{train_{n,1:T_n}},$$

if the following criteria are satisfied, $$I_F(I_{n,t}, \tilde{I}_{n,t}) = \frac{1}{N}[I(\tilde{r}_{n,t} < r_{n,t})] < \epsilon \qquad (22)$$

wherein, $r_{n,t} \in R^{T_n \times N}$ is the mathematical quantification of non-identicalenough and it denotes the minimum weighted Euclidean distance between $$I_{train_{n,t}}$$

and the rest of the observations in $$I_{train_{n,1:T_n}}, \forall n \in \{1, \dots, N\}. \qquad (23)$$

$$r_{n,t} = \min_{I_{train_{n,t+1}}} \left\| w \cdot (I_{train_{n,t}} - I_{train_{n,t+1}}) \right\|,$$

$$I_{train_{n,t+1}} \in I_{train_{n,1:T_n}}/I_{train_{n,t}}$$

wherein, $\tilde{r}_{n,t} \in R^{T_n \times N}$ is the minimum weighted euclidean distance between $I_{train_{n,t}}$ and the observations in the synthetic-private dataset, $\tilde{I}_{n,1:T_n}$, $\forall n \in \{1, \dots, N\}$.

$$\tilde{r}_{n,t} = \min_{\tilde{I}_{n,t} \in \tilde{I}} \left\| w \cdot (I_{train_{n,t}} - \tilde{I}_{n,t}) \right\| \qquad (24)$$

Herein, equation (22) states that ε-process identifiability for each f-dimension time series data observed at a time point, $$t, I_{train_{n,t}} \in D^{(f)},$$

of a particular sequence, $n \in \{1, \dots, N\}$ is defined as the probability that the weighted euclidean distance to the nearby synthetic-private f-dimension time series data observed at timepoint, $t(\in 1:T_n)$, $\tilde{I}_{n,t} \in D^{(f)}$, $\forall n \in \{1, \dots, N\}$ is closer (most certainly not, non-identical enough) than the weighted Euclidean distance from the adjacent real observation, at time-point, $t(\in 1:T_n)$, $$I_{train_{n,t+1}} \in D^{(f)},$$

$$\forall n \in \{1, \dots, N\}$$

is less than ε. To put it another way, 1−ε is the proportion of real dataset observations that are not identifiable by synthetic-private dataset observations due to the sole reason that the synthetic-private dataset observations are non-identical enough from the real dataset observations. Therefore, 0-process identifiability denotes peak privacy, and 1-process identifiability represents least-privacy, I is an identity function. Let us assume, $$H(I_{n,1:T_n}^{(k)}), \forall n \in \{1, \dots, N\}$$

represents the entropy of the k-th feature variable. For evaluating the entropy of continuous feature variables, $\{1, \dots, c\} \subset f$. Each continuous feature attribute is quantized.

$$w = (w_1, \dots, w_c) = \left( \frac{1}{H(I_{n,1:T_n}^{(1)})}, \dots, \frac{1}{H(I_{n,1:T_n}^{(c)})} \right)$$

where $w_i \in [0, \infty)$. The discrete entropy of the continuous feature variables is described as:

$$H(I^{(k)}) = -\sum_{I_{n,1:T_n}^{(k)} \in D_k} P(I^{(k)} = I_{n,1:T_n}^{(k)}) \log(P(I^{(k)} = I_{n,1:T_n}^{(k)})), \qquad (25)$$

$$\forall n \in \{1, \dots, N\}$$

In the batch training of the technique, computing Equation (22) for each observation involves high-computational complexity. The process-identifiability loss function, $L_{PI}$ is simplified and described by, $$L_{PI} = E_{I,\tilde{I}|I} \left[ -\left\| W \cdot (I_{train_{n,1:T_n}} - \tilde{I}_{n,1:T_n}) \right\| \right], \qquad (26)$$

$$\forall n \in \{1, \dots, N\}$$

In yet another embodiment, the generator neural network (122) $G_{ppGAN}$ maximizes the weighted euclidean distance between synthetic-private data sample $\tilde{I}_{n,1:T_n}$ and the conditioned real data $$I_{train_{n},1:T_n}$$

given that $I_{n,1:T_n}$ satisfies the $\epsilon$ process-identifiability criteria.

To begin with, the embedding neural network (118) ($E_{ppGAN}$) and the recovery neural network (120) ($R_{ppGAN}$) are trained jointly in the supervised-learning approach on the task of restoration of the real temporal data, $$I_{train_{n},1:T_n}$$

with a goal to learn higher-dimensional latent embeddings from the lower-dimensional multivariate mixed-feature dataset, $$I_{train_{n},1:T_n} \cdot$$

At first, the supervisor neural network (128) ($S_{ppGAN}$) is leveraged to model the non-linear temporal dynamics of the real data. The forecasting modeler is trained in the supervised-learning approach on the complex task of single-step ahead prediction of the real latent embedding, $$H_{train_{n},1:T_n}$$

by operating in the latent space, H.

Initially, the critic neural network (124) ($F_{ppGAN}$) is utilized to learn the relationship between the independent feature variables and the target variable. The predictive modeler is trained on the real data to map the independent feature variables to the target variable by minimizing the prediction loss, $L_F$. In the beginning, the goal is to minimize, $\min_{\Phi_e,\Phi_r,\Phi_s,\Phi_c}(L_R+L_S+L_F)$ in supervised learning approach by operating on the lower-dimensional mixed-feature dataset, $$I_{train_{n},1:T_n}$$

to learn the patterns of the real data. $\Phi_e$, $\Phi_r$, $\Phi_s$, $\Phi_c$ denote the learnable parameters of the embedding, the recovery, the supervisor, and the critic neural network (124), respectively. Let $\theta_g$, $\theta_d$ denote the learnable parameters of the $G_{ppGAN}$, $D_{ppGAN}$ neural network functions. $G_{ppGAN}$ is trained by seven distinct loss functions $L_{US}$, $L_U$, $L_W$, $L_M$, $L_S$, $L_F$ & $L_{LP}$. $G_{ppGAN}$ is trained adversarial to minimize the weighted sum of the above loss functions:

$$L_G = \min_{\theta_g}(\alpha((-L_U) + \gamma(L_W) + (-L_{LP})) + L_{US} + \beta L_M + L_S + L_F) \quad (27)$$

wherein, $\alpha \in R^+$. In our experiments, $\alpha=100$ & $\gamma=10$. $D_{ppGAN}$ is trained by three distinct loss functions $L_U$, $L_W$ & $L_{LP}$. $D_{ppGAN}$ is trained to minimize the weighted sum of the loss functions:

$$L_D = \min_{\theta_d}(\alpha((L_U) + \gamma(-L_W) + (L_{LP}))) \quad (28)$$

$G_{ppGAN}$, $D_{ppGAN}$ are trained adversarially by deceptive input as follows, $\min_{G_{ppGAN}}\max_{D_{ppGAN}}L(G_{ppGAN},D_{ppGAN})$. It can be expressed as:

$$\min_{\theta_g}\left[\alpha((-L_U) + \gamma(L_W) + (-L_{LP})) + L_{US} + \right.$$
$$\left. \beta L_M + L_S + L_F + \max_{\theta_d}(\alpha((-L_U) + \gamma(L_W) + (-L_{LP})))\right] \quad (29)$$

After training $G_n$ of the ppGAN architecture on $$D_{train_{n},1:T_n} \cdot$$

The performance of the technique is evaluated and reported on $$D_{train_{n},1:T_n} \cdot \hat{D}_{n,1:T_n}$$

is determined independently by sampling sequences using $G_n$.

Referring FIG. 3, to illustrate a processor-implemented method (300) for privacy preserving generative mechanism for data-disclosure of the industrial data is provided.

Initially, at the step (302), receiving, via an input/output interface, a multivariate mixed-variable time series data of a plurality of sensory observations, the cluster-labels associated with the multivariate mixed-variable time series data and a cluster-independent random noise.

At the next step (304), pre-processing the received multivariate mixed-variable time series data. Wherein, the pre-processing comprising normalizing continuous feature variables by bounding heterogeneous measurements between a predefined range of a min-max scaling technique and transforming discrete feature variables by representing as a sparse binary vector through a one-hot encoding technique.

At the next step (306), training a plurality of neural networks of a privacy preserving adversarial neural network architecture in two phases, wherein the plurality of neural networks including an embedding neural network, a recovery neural network (120), a generator neural network (122), a critic neural network (124) and a discriminator neural network (126).

At the next step (308), providing a test data to generate a synthetic private dataset for data disclosure using the trained privacy preserving adversarial neural network architecture.

At the last step (310), estimating identifiability among the multivariate mixed-variable time series data and the generated synthetic private dataset, wherein the estimation must satisfy a predefined process-identifiability criteria.

Referring FIG. 4, wherein a first phase training (400) of the plurality of neural networks of a privacy preserving adversarial neural network architecture, in accordance with some embodiments of the present disclosure.

Initially, at step (402) training the embedding neural network using a predefined low-dimensional mixed feature training dataset to obtain a high-dimensional mixed feature embeddings.

At the next step (404), training the recovery neural network (120) using the obtained high-dimensional mixed feature embeddings to reconstruct the low-dimensional mixed feature dataset.

At the next step (406), training a supervisor network using the obtained high-dimensional mixed-feature embeddings for a single step ahead predictions of the high-dimensional mixed-feature embeddings, wherein the supervisor network is utilized to model the temporal dynamics of the low-dimensional mixed feature training dataset.

At the last step (408), training the critic neural network (124) using the high-dimensional mixed feature embeddings to predict a target high-dimensional feature embedding, wherein the critic neural network (124) is utilized to model the relationship between independent and dependent variables of the low-dimensional mixed feature training dataset Referring FIG. 5, wherein a second phase training (500) of the plurality of neural networks of a privacy preserving adversarial neural network architecture, in accordance with some embodiments of the present disclosure. Initially, at the step (502) transforming, via the one or more hardware processors, cluster-independent random noise using one or more cluster-labels associated with a predefined training dataset to obtain a cluster-dependent random noise.

At the next step (504), performing a linear transformation on a concatenation of the low-dimensional mixed feature training dataset and the cluster-dependent random noise to obtain a synthetic-private noise.

At the next step (506), training the generator neural network (122) using the obtain synthetic-private noise to obtain a high-dimensional synthetic-private mixed feature embeddings.

At the next step (508), training the critic neural network (124) using the high-dimensional synthetic-private mixed feature embeddings to predict the synthetic-private target feature embedding.

At the next step (510), training the discriminator neural network (126) using the high-dimensional synthetic-private mixed feature embeddings to assign a label. The discriminator neural network (126) classifies the high-dimensional synthetic-private mixed feature embeddings as fake.

At the next step (512), training the supervisory neural network (128) using the high-dimensional synthetic-private mixed feature embeddings to generate the single-step ahead predictions of the high-dimensional synthetic-private mixed feature embeddings.

At the last step (514), training the recovery neural network (120) using a single-step ahead high-dimensional synthetic-private mixed feature embeddings to obtain the low-dimensional synthetic-private mixed feature dataset.

EXPERIMENTAL RESULT

In an example, wherein electricity transformer datasets are divided into train and test subsets of the same domain in the ratio 80/20%. The privacy preserving synthetic dataset is obtained by utilizing the real train dataset. LSTM & LSTM* are leveraged as a baseline model trained on real train data and on the privacy-preserving synthetic data respectively for both the downstream tasks of target variable prediction/one-step ahead prediction with distinct learnable parameters. The models are evaluated on real test data and performance is reported in terms of RMSE metric. WD & Ss denotes the Wasserstein distance and silhouette score, respectively. In our experiments, k is utilized to regulate the privacy-breach acceptable & to determine the $\varepsilon$-process identifiability. For $\lambda=0.1$, as shown in Table 1, the low value of Kantorovich-Rubinstein metric (range in $[0;+\infty]$) on all the datasets indicates that the generated synthetic-private datasets probability distributions matches to that of the corresponding real datasets and is close to zero in relative with the synthetic-private datasets generated for $\lambda=100$. In case of $\lambda=0.1$, all the corresponding privacy-preserving synthetic datasets have retained their utility on target-variable prediction relative to the synthetic-private datasets generated from $\lambda=100$ in comparison with the real data. For the synthetic-private dataset, corresponding to $\lambda=0.1$ the $\varepsilon$-process identifiability metric is relatively high(retains data utility) in comparison with the $\lambda=100$, which has lack-luster utility. Herein, for $ETTm_1$ dataset, with $\lambda=0.1$, $\varepsilon=0.175$ indicates that over and above 82.5% of the process sensory observations are not de-identifiable by the adversary.

TABLE 1

| Dataset | LSTM | LSTM* λ | | WD measure λ | | Identifiability Metric λ | |
|---|---|---|---|---|---|---|---|
| | | 0.1 | 100 | 0.1 | 100 | 0.1 | 100 |
| $ETTh_1$ | 11.932 | 13.298 | 24.153 | 1.237 | 6.092 | 0.268 | 0 |
| $EETh_2$ | 11.256 | 11.717 | 12.284 | 5.887 | 11.210 | 0.091 | 0 |
| $ETTm_1$ | 11.278 | 13.521 | 36.386 | 2.930 | 8.999 | 0.175 | 0 |
| $EETm_2$ | 10.930 | 12.048 | 28.292 | 5.368 | 8.032 | 0.054 | 0 |

Furthermore, a K-means clustering technique determines the preordained cluster manifolds in the multidimensional dataset. The clusters are projected onto the 2-PCA components plots. For $\lambda=0.1$, on all the synthetic private datasets the Ss score is relatively close to the real dataset in comparison to $\lambda=100$. Referring below Table 2, for $\lambda=0.1$, all the synthetic-private datasets conserve the temporal dynamics of the original data in comparison to $\lambda=100$. As reported in Table 1, for $\lambda=100$, the $\varepsilon$-process identifiability is zero, the privacy is at peak. The synthetic-private dataset is unidentifiable, but it shifts from the original true data distributions and results in less utility for application. The results reported in our work is obtained by a statistical average of five different experimental runs.

TABLE 2

| Dataset | Method | | HUFL | HULL | MUFL | MULL | LUFL | LULL | OT |
|---|---|---|---|---|---|---|---|---|---|
| | | | | | | Features | | | |
| ETTh$_1$ | LSTM | | 9.35 | 5.05 | 9.14 | 4.80 | 3.86 | 2.63 | 4.89 |
| | LSTM* | $\lambda$ = 0.1 | 14.21 | 5.12 | 14.06 | 4.68 | 4.28 | 2.72 | 7.92 |
| | | $\lambda$ = 100 | 22.75 | 10.55 | 22.67 | 10.59 | 9.04 | 5.69 | 16.81 |
| ETTh$_2$ | LSTM | | 9.17 | 9.90 | 8.34 | 8.32 | 7.59 | 6.10 | 9.26 |
| | LSTM* | $\lambda$ = 0.1 | 11.58 | 14.33 | 9.17 | 13.08 | 10.97 | 6.16 | 12.92 |
| | | $\lambda$ = 100 | 25.71 | 20.32 | 28.56 | 17.14 | 13.71 | 29.52 | 24.05 |
| ETTm$_1$ | LSTM | | 7.67 | 4.21 | 7.69 | 4.09 | 2.74 | 2.14 | 3.60 |
| | LSTM* | $\lambda$ = 0.1 | 12.11 | 4.64 | 11.87 | 4.06 | 4.03 | 2.86 | 9.01 |
| | | $\lambda$ = 100 | 23.27 | 11.39 | 23.23 | 10.67 | 9.30 | 6.24 | 17.57 |
| ETTm$_2$ | LSTM | | 8.62 | 861.00 | 7.87 | 7.41 | 6.50 | 5.26 | 7.85 |
| | LSTM* | $\lambda$ = 0.1 | 9.93 | 12.69 | 8.84 | 10.89 | 10.37 | 7.19 | 11.43 |
| | | $\lambda$ = 100 | 20.09 | 22.28 | 22.12 | 17.62 | 17.49 | 26.49 | 20.07 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the need of privacy-enhanced mathematical framework for data-disclosure of the sensitive industrial multivariate mixed-variable time series data which trades-off with utility to preserve the original data characteristics in the synthetic-private dataset. In a nutshell, a Privacy-Preserving Generative Adversarial Networks(ppGAN), a private learning technique that minimizes and also regulates the information flow based on the rubric defined on the optimal transport for machine learning in the Kantorovich formulation between the empirical probability distributions of the synthetic-private data and the non-linear original data. The framework comprises a generator neural network (122) that sanitizes the multivariate mixed-variable time series dataset to a certain extent that occludes the threat of inference attacks on the process-plant databases, and a discriminator neural network (126) that attempts to maximize the Wasserstein distance between the real data & privacy-preserving synthetic data probability distributions. The framework discovers the privacy-utility pareto fronts, by taking into account the hyperparameter tuning, and elevating process-identifiability above the concept of risk to its potential benefit ratio with respect to the data-owner monetary gains (data monetization) versus privacy breach, deemed acceptable.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium"

should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising steps of:

receiving, via an input/output interface, a multivariate mixed-variable time series data of a plurality of sensory observations, cluster-labels associated with the multivariate mixed-variable time series data, and a cluster-independent random noise, wherein multivariate mixed-variable time series data comprises continuous and discrete feature variables;

pre-processing, via one or more hardware processors, the received multivariate mixed-variable time series data, wherein the pre-processing comprising steps of:

normalizing the continuous feature variables by bounding heterogeneous measurements between a predefined range using a min-max scaling technique; and transforming the discreate feature variables by representing as a sparse binary vector using a one-hot encoding technique, training, via the one or more hardware processors, a plurality of neural networks of a privacy preserving generative adversarial network (ppGAN) in a first phase and a second phase using pre-processed multivariate mixed-variable time series data, wherein the plurality of neural networks including an embedding neural network, a recovery neural network, a generator neural network, a critic neural network and a discriminator neural network, wherein the discriminator neural network classifies the high-dimensional synthetic-private mixed feature embeddings as real or fake, wherein training the plurality of neural networks of the ppGAN in the first phase comprises:

training, via the one or more hardware processors, the embedding neural network using a predefined low-dimensional mixed feature training dataset to obtain a high-dimensional mixed feature embeddings, wherein the embedding neural network ($E_{ppGAN}$) comprises:

learning a high-dimensional representation, $$H_{train_{n,1:T_n}}, \forall n \in \{(1, 2, \ldots, N)\}$$

by transforming the corresponding low-dimensional real sequences, $$\tilde{I}_{train_{n,1:T_n}}, \forall n \in \{(1, 2, \ldots, N)\};$$

assisting in learning by incorporating semantics of the mixed-feature learning a high-dimensional representation, $$H_{train_{n,1:T_n}};$$

and $$E_{ppGAN}: I_{train_{n,1:T_n}} \in \prod_t \prod_{j=1}^{f} D_j \rightarrow H_{train_{n,1:T_n}} \in \prod_t \prod_{j=1}^{f} H_j,$$

$$\forall n \in \{(1, 2, \ldots, N)\}$$

wherein, $D_j$, $H_j$ denotes a j-th feature variable space and a latent embedding vector space;

providing, via the one or more hardware processors, a test data to generate a synthetic private dataset for data disclosure using the trained plurality of neural networks of the ppGAN; and estimating, via the one or more hardware processors, an identifiability of the multivariate mixed-variable time series data from the generated synthetic private dataset, wherein the estimation satisfies a predefined process-identifiability criteria.

2. The processor-implemented method of claim 1, wherein the first phase training of the plurality of neural networks of the ppGAN further comprising steps of:

training, via the one or more hardware processors, the recovery neural network using the obtained high-dimensional mixed feature embeddings to reconstruct the low-dimensional mixed feature dataset;

training, via the one or more hardware processors, the supervisor neural network using the obtained high-dimensional mixed-feature embeddings for a single step ahead predictions of the high-dimensional mixed-feature embeddings, wherein the supervisor neural network is utilized to model a temporal dynamics of the low-dimensional mixed feature training dataset, wherein trainable parameters of the embedding neural network and recovery neural network are updated by optimizing a cost function through the joint training of the networks in a supervised-learning approach by incorporating inductive bias of reconstruction of the original input by minimizing a supervised loss; and training, via the one or more hardware processors, the critic neural network using the high-dimensional mixed feature embeddings to predict a target high-dimensional feature embedding, wherein the critic neural network is utilized to model the relationship between independent and dependent variables of the low-dimensional mixed feature training dataset, wherein the critic neural network comprises a neural-network function leveraged for predictive modeling using a predictive modeler that maps the independent mixed-feature variables to the target variable trained in the supervised learning approach and wherein the predictive modeler of the critic neural network is trained on a real data to map the independent feature variables to target variable by minimizing the prediction loss.

3. The processor-implemented method of claim 1, wherein a second phase training of the plurality of neural networks of a ppGAN comprising steps of:

transforming, via the one or more hardware processors, cluster-independent random noise using one or more cluster-labels associated with a predefined training dataset to obtain a cluster-dependent random noise;

performing, via the one or more hardware processors, a linear transformation on a concatenation of the low-dimensional mixed feature training dataset and the cluster-dependent random noise to obtain a synthetic-private noise;

training, via the one or more hardware processors, the generator neural network using the obtained synthetic-private noise to obtain a high-dimensional synthetic-private mixed feature embeddings;

training, via the one or more hardware processors, the critic neural network using the high-dimensional synthetic-private mixed feature embeddings to predict the synthetic-private target feature embedding;

training, via the one or more hardware processors, the discriminator neural network using the high-dimensional synthetic-private mixed feature embeddings to assign a label;

training, via the one or more hardware processors, the supervisory neural network using the high-dimensional synthetic-private mixed feature embeddings to generate a single-step ahead predictions of the high-dimensional synthetic-private mixed feature embeddings; and training, via the one or more hardware processors, the recovery neural network using the single-step ahead high-dimensional synthetic-private mixed feature embeddings to obtain the low-dimensional synthetic-private mixed feature dataset.

4. The processor-implemented method of claim 1, wherein a low-dimensional mixed feature validation dataset is utilized for the hyper-parameter tuning of the ppGAN.

5. A system comprising:

an input/output interface to a multivariate mixed-variable time series data of a plurality of sensory observations, cluster-labels associated with the multivariate mixed-variable time series data, and a cluster-independent random noise, wherein multivariate mixed-variable time series data comprises continuous and discrete feature variables;

a memory in communication with the one or more hardware processors, wherein the one or more hardware processors are configured to execute programmed instructions stored in the memory to:

pre-process the received multivariate mixed-variable time series data, wherein the pre-process includes normalizing the continuous feature variables by bounding heterogeneous measurements between a predefined range through a min-max scaling technique, and transforming discreate feature variables by representing as a sparse binary vector through a one-hot encoding technique;

train a plurality of neural networks of a privacy pre-serving generative adversarial network (ppGAN) in a first phase and a second phase using pre-processed multivariate mixed-variable time series data, wherein the plurality of neural networks including an embedding neural network, a recovery neural network, a generator neural network, a critic neural network, and a discriminator neural network, wherein the discriminator neural network classifies the high-dimensional synthetic-private mixed feature embeddings as real or fake, wherein training the plurality of neural networks of the ppGAN in the first phase comprises:

training, via the one or more hardware processors, the embedding neural network using a predefined low-dimensional mixed feature training dataset to obtain a high-dimensional mixed feature embeddings, wherein the embedding neural network ($E_{ppGAN}$) comprises:

learning a high-dimensional representation, $$H_{train_{n,1:T_n}}, \forall n \in \{(1, 2, \ldots, N)\}$$

by transforming the corresponding low-dimensional real sequences, $$I_{train_{n,1:T_n}}, \forall n \in \{(1, 2, \ldots, N)\};$$

assisting in learning by incorporating semantics of the mixed-feature variables in feature embeddings, $$H_{train_{n,1:T_n}};$$

and $$E_{ppGAN}: I_{train_{n,1:T_n}} \in \prod_t \prod_{j=1}^{f} D_j \rightarrow H_{train_{n,1:T_n}} \in \prod_t \prod_{j=1}^{f} H_j,$$

$$\forall n \in \{(1, 2, \ldots, N)\}$$

wherein, $D_j$, $H_j$ denotes a j-th feature variable space and a latent embedding vector space;

provide a test data to generate a synthetic private dataset for data disclosure using the trained plurality of neural networks of the ppGAN; and estimate an identifiability of the multivariate mixed-variable time series data from the generated synthetic private dataset, wherein the estimation satisfies a predefined process-identifiability criteria.

6. The system of claim 5, wherein a low-dimensional mixed feature validation dataset is utilized for the hyper-parameter tuning of the ppGAN.

7. A non-transitory computer readable medium storing one or more instructions which when executed by one or more processors on a system, cause the one or more processors to perform method comprising steps of:

receiving, via an input/output interface, a multivariate mixed-variable time series data of a plurality of sensory observations, cluster-labels associated with the multivariate mixed-variable time series data, and a cluster-independent random noise, wherein multivariate mixed-variable time series data comprises continuous and discrete feature variables;

pre-processing, via one or more hardware processors, the received multivariate mixed-variable time series data, wherein the pre-processing comprising steps of:

normalizing the continuous feature variables by bounding heterogeneous measurements between a predefined range through a min-max scaling technique; and transforming the discrete feature variables by representing as a sparse binary vector using a one-hot encoding technique, training, via the one or more hardware processors, a plurality of neural networks of a privacy preserving generative adversarial network (ppGAN) in a first phase and a second phase using pre-processed multivariate mixed-variable time series data, wherein the plurality of neural networks including an embedding neural network, a recovery neural network, a generator neural network, a critic neural network, and a discriminator neural network, wherein the discriminator neural network classifies the high-dimensional synthetic-private mixed feature embeddings as real or fake, wherein training the plurality of neural networks of the ppGAN in the first phase comprises:

training, via the one or more hardware processors, the embedding neural network using a predefined low-dimensional mixed feature training dataset to obtain a high-dimensional mixed feature embeddings, wherein the embedding neural network ($E_{ppGAN}$) comprises:

learning a high-dimensional representation, $$H_{train_{n,1:T_n}}, \forall\, n \in \{(1, 2, \ldots, N)\}$$

by transforming the corresponding low-dimensional real sequences, $$\tilde{I}_{train_{n,1:T_n}}, \forall\, n \in \{(1, 2, \ldots, N)\};$$

$$\{(1, 2, \ldots, N)\};$$

assisting in learning by incorporating semantics of the mixed-feature variables in feature embeddings, $$H_{train_{n,1:T_n}};$$

and $$E_{ppGAN}: I_{train_{n,1:T_n}} \in \prod_t \prod_{j=1}^{f} D_j \to H_{train_{n,1:T_n}} \in \prod_t \prod_{j=1}^{f} H_j,$$

$$\forall\, n \in \{(1, 2, \ldots, N)\}$$

wherein, $D_j$, $H_j$ denotes a j-th feature variable space and a latent embedding vector space;

providing, via the one or more hardware processors, a test data to generate a synthetic private dataset for data disclosure using the trained plurality of neural networks of the ppGAN; and estimating, via the one or more hardware processors, an identifiability of the multivariate mixed-variable time series data from the generated synthetic private dataset, wherein the estimation satisfies a predefined process-identifiability criteria.

\* \* \* \* \*